Dec. 30, 1969   B. K. JOHNSON ET AL   3,487,142
PROCESSES AND APPARATUS FOR THE SPINNING OF
SYNTHETIC FIBER-FORMING POLYMERS
Filed Dec. 28, 1966   5 Sheets-Sheet 1
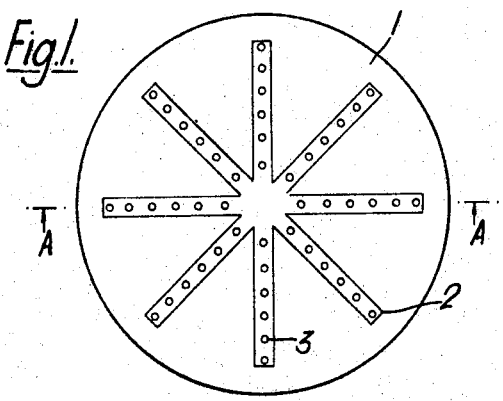
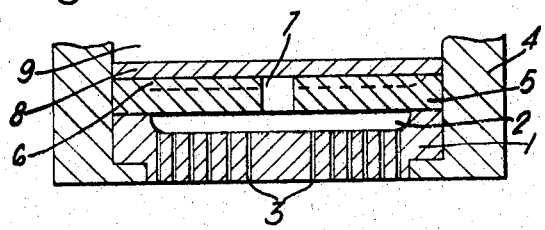
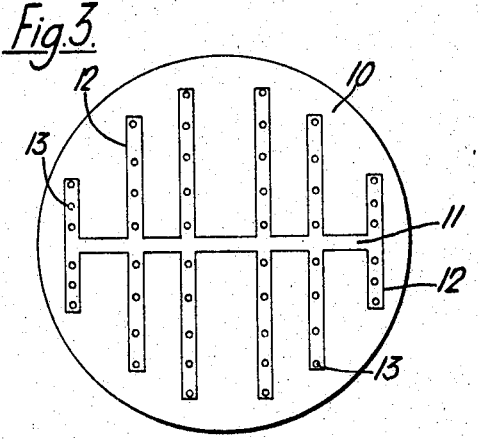
Inventors
BRYAN KINGSLEY JOHNSON
STANLEY DAVIES
By Cushman, Darby & Cushman
Attorneys

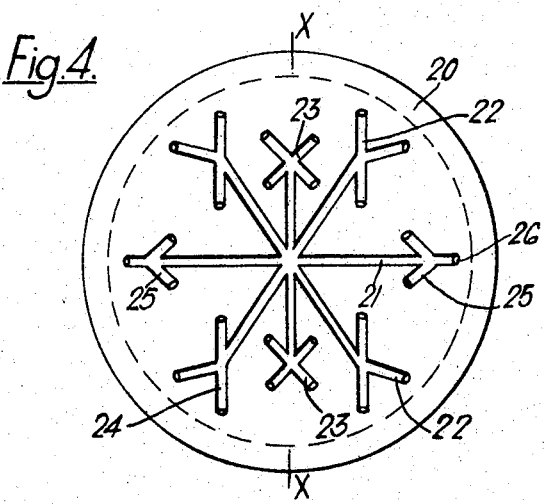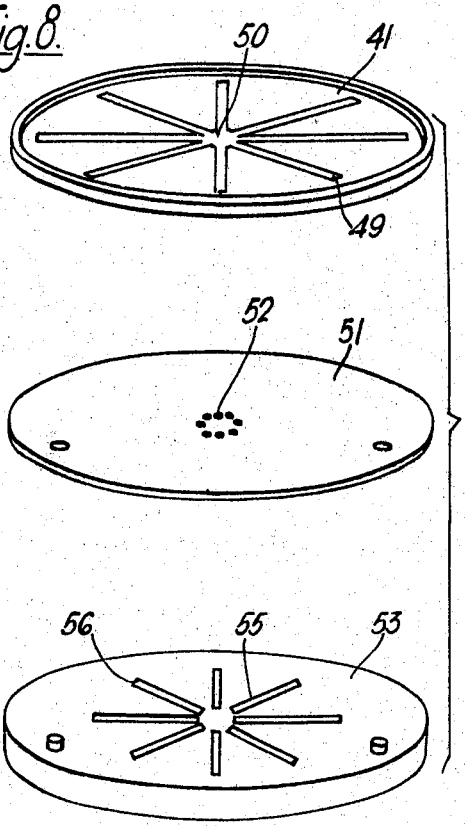

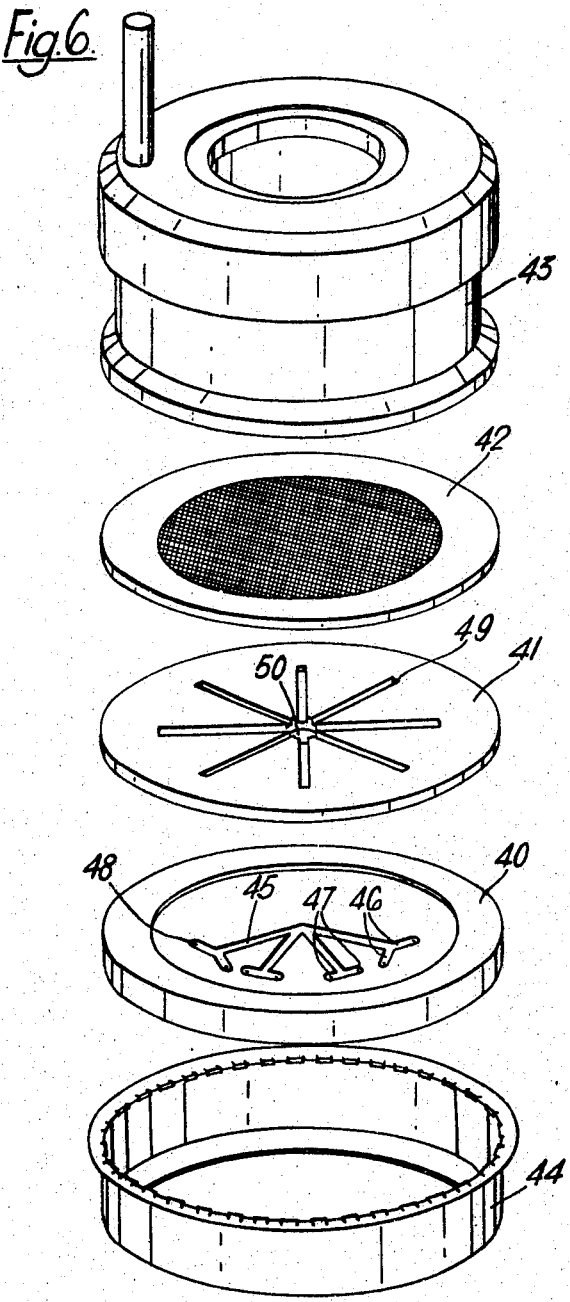

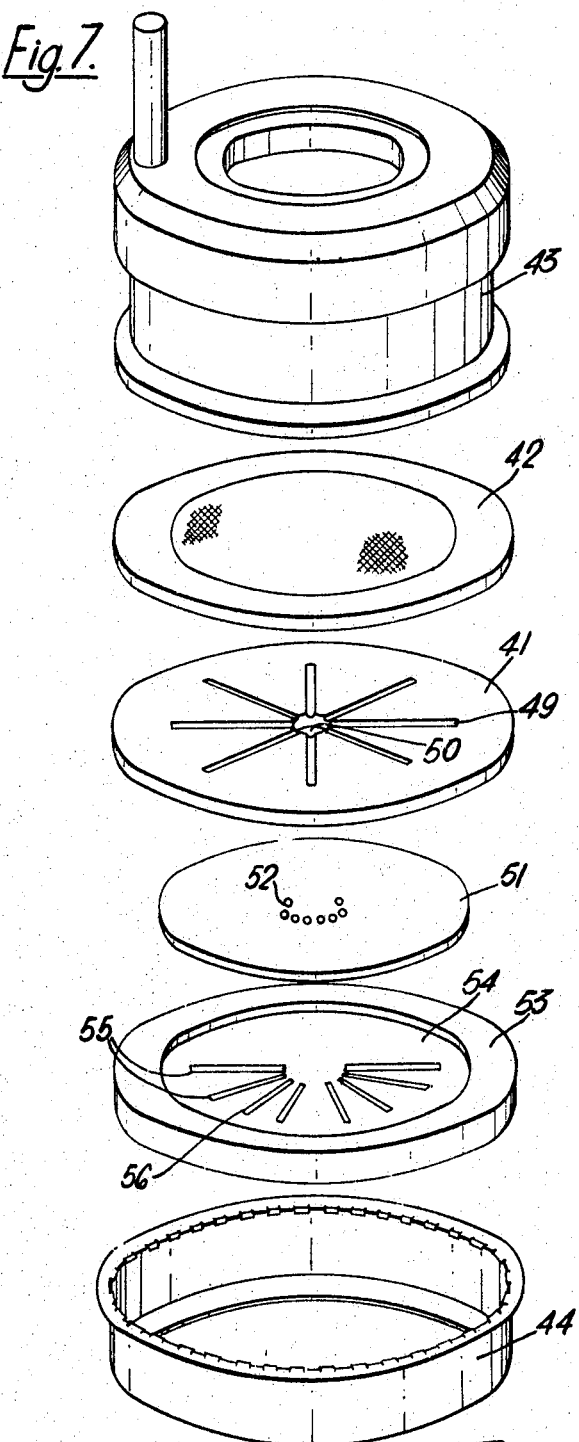

United States Patent Office 3,487,142
Patented Dec. 30, 1969

3,487,142
PROCESSES AND APPARATUS FOR THE SPINNING OF SYNTHETIC FIBER-FORMING POLYMERS
Bryan Kingsley Johnson, Abergavenny, and Stanley Davies, Pontypool, England, assignors to Imperial Chemical Industries Limited, London, England, a corporation of Great Britain
Filed Dec. 28, 1966, Ser. No. 605,353
Claims priority, application Great Britain, Jan. 3, 1966, 79/66
Int. Cl. D01d 5/08, 1/10
U.S. Cl. 264—176
21 Claims

ABSTRACT OF THE DISCLOSURE

Process for melt spinning in which molten polymer is introduced into an array of channels from a fixed point so that polymer flows along the channels in a unidirectional manner, the impedance of the channels being small compared with that of the extrusion orifices which communicate therewith. Where a filter pack is employed, the polymer may be collected at the bottom thereof by means of a collector plate having a central orifice, which orifice may supply polymer either directly to the array of channels, or to small orifices contained in a plate positioned above the channels, where the orifices communicate with an end portion of each channel.

---

The present invention is concerned with improvements in processes and apparatus for spinning synthetic fibre-forming polymers and is especially concerned with processes involving melt spinning.

In processes currently used to melt spin synthetic fibre-forming polymers, such as polyamides for example, it is known to employ spinnerets having channels in the upper-face thereof to assist in the distribution of polymer to the spinneret orifices. A number of channel systems have been proposed in the past with the object, inter alia, of improving between-filament uniformity, with particular regard to denier. Such processes suffer from a number of disadvantages including the following:

(a) The between filament uniformity with respect to denier is not adequate in all processes, (b) There is a tendency for polymer to stagnate especially at the end of polymer channels and between spinneret orifices, with consequent undesirable production of "gel," and (c) Since it is necessary that each extrusion orifice should have substantially the same catchment area this in practice means that all the orifices are fairly evenly and symmetrically distributed over the spinneret and thus there are difficulties when it is desired to "split" the bundle of extruded filaments into several smaller bundles, especially when using one metering pump to supply polymer to more than one threadline.

Also the filaments in the centre and front of the bundle are cooled at a different rate to those on the back owing to poor air circulation and shielding effect within the bundle since cooling air is normally applied from the back of the bundle. Furthermore, since these spinnerets are normally part of a larger spinneret assembly incorporating a filter pack, non-uniform filaments across the spinneret are produced as a result of temperature variations and inequalities in the impedance to flow of polymer across the filter pack.

We have now found that the aforementioned disadvantages can be ameliorated by collecting the polymer from the filter pack and introducing it into an array of channels, located above the extrusion orifices, at a fixed point such that polymer flow is in one direction only along each channel in the array and arranging that the impedance to viscous liquid flow of the channels compared with that of the extrusion orifices is relatively low and the impedance of the channel path from the fixed entry point to each extrusion orifice is substantially the same.

Accordingly, therefore, from one aspect the present invention provides a process for the manufacture of filaments from a fibre-forming synthetic polymer wherein the polymer in viscous liquid form is introduced into at least one array of channels, located above and in communication with extrusion orifices contained in a spinneret plate, at one fixed point for each array of channels, to permit polymer flow in one direction only along the said channels and the polymer extruded through the extrusion orifices to form filaments which are subsequently wound up, the impedance to flow of polymer through the channels being small compared with the impedance to flow through the extrusion orifices to provide controlled rates of volume flow of polymer through all extrusion orifices.

Preferably the impedance to flow of polymer through the extrusion orifices is substantially equal at each orifice to provide substantially equal rates of volume flow through all extrusion orifices.

The term "viscous liquid form" when applied to polymers in this context includes polymer solutions and molten polymers.

Preferably there is only one collection point for the polymer even though more than one channel array may be used.

From another aspect the invention provides a spinneret assembly comprising a spinneret plate containing a plurality of extrusion orifices, at least one array of channels located above and in communication with the extrusion orifices and means for introducing a fibre-forming polymer in viscous liquid form into each array of channels at a fixed point, all of the said channels in each array being in communication with the point of introduction of the polymer to the array, either directly, or indirectly, such that the polymer flows from the point of introduction along all channels, the flow in any channel being in one direction only.

Conveniently in melt spinning processes employing a filter pack the means for introducing the polymer into a single array of channels consists of a collector plate positioned immediately below the filter pack and which has a central orifice through which all of the filtered polymer passes. The collector plate may be integral with the filter pack if desired.

The array of channels is preferably formed in the top face of the spinneret plate but may, if desired, be formed in the lower face of the collector plate or in a separate distributor plate located immediately above the spinneret plate. In another arrangement semi-circular section channels may be formed in the spinneret plate and complimentary semi-circular section channels formed in the collector plate so that on assembly of the two plates channels of circular section are formed therebetween.

Conveniently the channels may radiate outwardly from a central point of introduction of polymer, or they may be in the form of arms radiating from other channels in communication with the point of introduction of polymer. For the purpose of the present specification, the expression "array of channels" includes a single channel.

The extrusion orifices are formed in the base of the channels, there being one orifice at the extreme end of each channel to avoid leaving a stagnation point at the end of the channels.

The process and apparatus of the invention will now be more fully described with reference to the accompanying drawings, which drawings are diagrammatic and illustrate embodiments of the apparatus.

In the drawings:

FIGURE 1 is a plan view of the top face of a spinneret plate having channels according to this invention.

FIGURE 2 is a cross-section of a spinneret assembly of this invention along the line A–A' of FIGURE 1.

FIGURE 3 is a plan view of another spinneret plate having channels according to this invention which may be used in the spinneret assembly of FIGURE 2.

FIGURE 4 is a plan view of another spinneret having channels according to the present invention which may also be used in the assembly of FIGURE 2.

FIGURE 6 is an exploded diagram of one spinneret and filter pack assembly according to the present invention.

FIGURE 7 is an exploded diagram of a further spinneret and filter pack assembly according to the present invention.

FIGURE 8 is an exploded view of a spinneret assembly according to the present invention.

Figure 5:
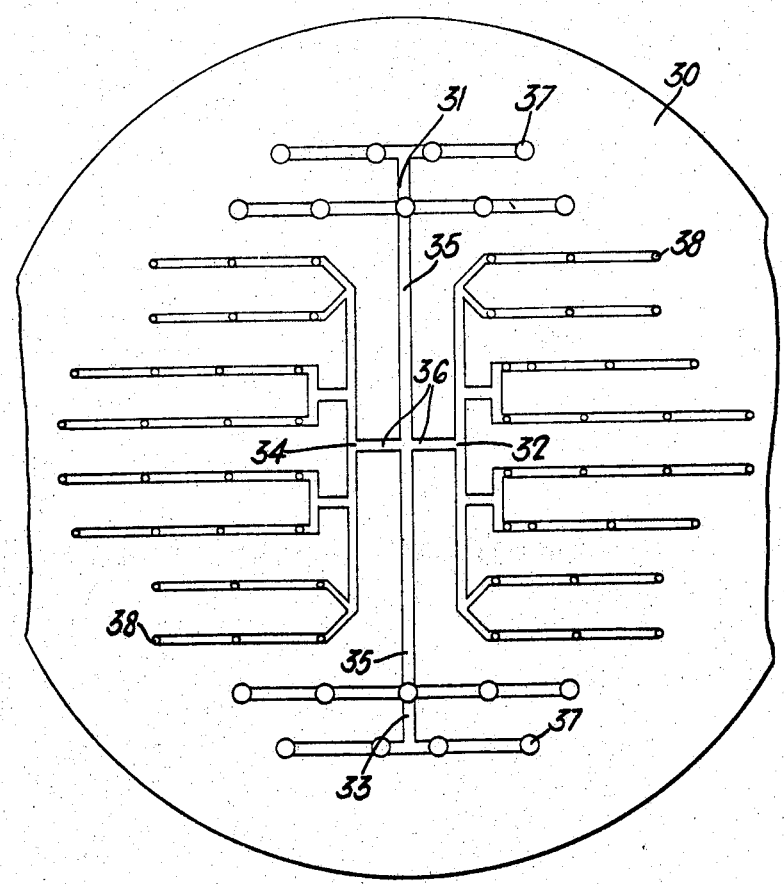
FIGURE 5 is a plan view of yet a further spinneret having channels according to the present invention which again may be used in the assembly of FIGURE 2.

In FIGURE 1 a spinneret plate 1 has eight channels 2 radiating from a central point and each containing six extrusion orifises 3.

In FIGURE 2 a spinneret assembly comprises a housing 4 containing the spinneret plate 1, a collector plate 5 containing channels 6 and a central hole 7 adapted to make a liquid tight seal with the spinneret plate, a sintered screen 8 and pack filling 9.

In FIGURE 3 the spinneret plate 10 contains a main channel 11 from which subsidiary channels 12 containing extrusion orifices 13 radiate at right angles.

The spinneret plate of FIGURE 4 consists of a plate 20 having eight main channels 21 radiating outwardly from a central point. At the extreme end of each of the major channels there is formed a series of three minor channels, 22, 23, 24 and 25, containing extrusion orifices 26 formed in their extremities.

The spinneret plate of FIGURE 5 consists of a plate 30 containing four arrays of channels, 31, 32, 33 and 34, communicating with a central point via channels 35 and 36. Arrays of channels 31 and 33 are the same and contain extrusion orifices 38 having a Y-shaped cross-section and arrays 32 and 34 are the same and contain extrusion orifices 37 having a circular cross-section.

In FIGURE 6 a spinneret plate 40, a collector plate 41 and a gauze screen 42 are located beneath filter pack housing 43 by means of the cap 44. Spinneret plate 40 contains four main channels 45 radiating from a central point. At the end of each main channel are two shorter channels 46 and 47, for example, which contain extrusion orifices 48 as near the ends thereof as possible. The collector plate 41 contains channels 49 communicating with a central hole 50.

In the assembly of FIGURE 7 the reference numerals where the same, have the same significance as those of FIGURE 6. In this assembly, however, an orifice plate 51, containing orifices 52 is fitted into the recess 54 of spinneret plate 53, the orifices lying beneath the central hole 50 in the collector plate. The channels 55 formed in the spinneret plate 53 do not, in this arrangement, meet at a central point but their extreme inner ends communicate with orifices 52 in the meter plate 51. Extrusion orifices 56 are located in the outer extreme ends of the channels 55.

In the spinneret assembly of FIGURE 8 the reference numerals have the same significance as in FIGURES 6 and 7. A different arrangement of channels 55 and orifice plate orifices 52 is shown in this arrangement and the spinneret plate is not recessed to take the orifice plate but has a plain surface on which the latter rests.

A method of melt spinning according to the present invention is conveniently described with reference to FIGURES 1 and 2. In these figures molten polymer, such as a polyamide, is filtered by the pack filling 9 and passes through the sintered screen 8 into the channels 6 in the collector plate 5. The channels 6 conduct the polymer to the central hole 8 which introduces the polymer into the centre of the array of channels 2 formed in the spinneret plate 1. Because the collector plate makes a liquid tight fit with the spinneret plate the polymer flows outwardly along each of the channels 2 and is extruded into filaments through the orifices 3 having uniform impedance. The channels each have the same cross-sectional dimensions and are so formed that each has substantially the same impedance per unit length to polymer flow, which impedance is small compared with that of the extrusion orifices. The rate of volume flow through each of the extrusion orifices is thus substantially the same and filaments having a narrow range of denier obtained.

The following examples illustrate the process and apparatus of the present invention by reference to the drawings, but are not intended in any way to limit the invention.

EXAMPLE 1

Using the spinneret assembly of the type shown in FIGURES 1 and 2 having spinneret channels 0.065 inch wide and 0.082 inch deep and 40 extrusion orifices 0.009 inch diameter and capillary length 0.027 inch, filaments of polyhexamethylene adipamide polymer were extruded at a throughput of 6 lbs./hour at a spinning temperature of 290° C. The maximum filament to filament denier difference was found to be about half that obtained using conventional channelled spinneret plates.

EXAMPLE 2

The invention allows spinneret orifice to be positioned so that the best cooling conditions are obtained for each filament and also to conveniently obtain "splits" of the filament bundle into a number of smaller bundles. Where a split into two bundles is required, then it may be convenient to use a spinneret plate having channels and extrusion orifices arranged as shown in FIGURE 3, the split being made at right angles to the main channel 11.

The arrangement of channels and spinneret orifices shown in the spinneret plate of FIGURE 4 is also suitable for "splitting." The plate may, for example, contain channels 0.060 inch wide and 0.080 inch deep and the orifices may be Y-shaped in cross-section and located in the base of 0.080 inch diameter counterbore, the arms of the Y being 0.032 inch by 0.004 inch. When used for spinning nylon 66 polymer into two undrawn bundles of 13 filaments, each and of nominal denier 102, the split is made along the line X—X. The denier variation between cakes in this process is only of the order of ±1%, whereas a conventional spinneret assembly gives a variation of about ±3 to 4%.

EXAMPLE 3

The invention may also be successfully employed to spin filaments of substantially the same denier through orifices of different cross sections contained in the same spinneret plate. Thus the channel pattern and extrusion orifice lay out shown in FIGURE 5 may be employed. In this arrangement the channels are 0.060 inch wide; the channels 35 leading to the channel arrays 33 containing the circular extrusion orifices are 0.051 inch deep and the channels 36 leading to the channel arrays containing Y-shaped extrusion orifices are 0.07 inch deep, all other channels are 0.08 inch deep. The circular extrusion orifices are 0.03 inch diameter, 0.075 inch long and formed in the base of a counterbore 0.060 inch diameter, and the Y-shaped orifices have arms 0.03 x 0.005 inch, a capillary length of 0.02 inch and are formed in the base of a counterbore of diameter 0.08 inch. Nylon 6.6 polymer spun using the assembly of FIGURE 2 and the above-mentioned spinneret plate under otherwise standard conditions yields a yarn of circular and trilobal cross section filaments. The circular filaments had a mean denier of 55.3, standard deviation 4.6, and the trilobal filaments a mean denier of 51.6, standard deviation 6.5. Using the same extrusion orifices sizes in a conventional spinneret plate and assembly the calculated filament denier for the circular orifices would be 77.4 and for the non-circular orifices 44.2 and it would be extremely difficult to achieve filament denier equality merely by changing the extrusion orifice dimensions.

EXAMPLE 4

Eight circular monofilaments were produced from nylon 6.6 polymer using the spinneret assembly of FIGURE 6 in which the spinneret channels were 0.085 inch deep and 0.065 inch wide and contained, at the terminal portion of each channel, one extrusion orifice 0.024 inch diameter formed in the base of a 0.060 inch diameter counterbore. The monofilaments had a filament to filament denier variation of ±2% and a denier variation of ±2% between filaments from successive spun cakes. Using a conventional spinneret assembly for the production of monofilaments the latter variation is normally of the order of ±4%.

Variations in channel extrusion orifice dimensions can result in variations in denier between filaments. This effect can be ameliorated by the use of constriction placed at the entrances to channels, each constriction having the same impedance. It can be shown that in order to limit the total denier variation between filaments extruded through orifices contained in two different channel arrays to within 2%, the impedance of the constrictions should be 9 times the total impedance of the channels and the extrusion orifices allowing for a ±10% variation in total channel plus extrusion orifice impedance.

Conveniently the constrictions may take the form of orifices formed in a plate, an orifice plate, positioned above and in contact with the spinneret plate, one orifice feeding polymer to one channel or one array of channels. A typical assembly which may be employed in the production of monofilaments and which makes use of an orifice plate has been described with reference to FIGURE 7. When using an orifice plate to supply polymer to the channels the channels do not communicate with each other. It is clear, of course, that the orifices in the orifice plate must lie beneath the hole in the collector plate and hence one end of each channel or array of channels must also terminate at this point.

EXAMPLE 5

Eight circular monofilament yarns were produced from nylon 6.6 polymer using the general spinneret assembly of FIGURE 7 but, with the orifice and spinneret plates of FIGURE 8. The channel and orifice dimensions were the same as used in Example 4. The filament to filament denier variation and the variation in filament denier between filaments from successive spun cakes was now reduced to ±1½%.

It is possible for one spinneret to contain two completely separate arrays of channels each having a single fixed point at which polymer is introduced. In these circumstances, it is preferable to supply the polymer from two separate filtration packs except when the impedance of the filter pack is very low.

The dimensions of the extrusion orifices and channels can be determined empirically using a simple spinneret consisting of a single channel containing, say, four equi-spaced orifices and the polymer introduced into the mid point thereof, and measuring the variation in denier at various channel sizes and hole dimensions.

If desired, the invention can be employed to deliberately vary the denier of the filaments in a yarn in a controlled manner. This may be achieved by varying the channel impedances and especially by varying the impedances of constrictions, e.g., size of orifice in an orifice plate, feeding polymer to the channels.

Although the invention has been described by reference to spinneret channels having a single orifice, or several orifices along the length thereof, it is also possible to employ wider channels and to group orifices together so that the centres of two orifices, for example, may form a line at right angles to the axis of the channel. In order, however, to ensure absence of stagnation points one orifice should always lie at the extreme end of each channel.

The collector plate, necessary in the present invention, has an added advantage in that it reduces the effect of non-uniformities of packing and temperature in the filter pack.

The use of such a collector plate has been previously disclosed in British Patent No. 596,010. In this use of the plate an unchannelled spinneret plate was placed close to the collector plate to give a high impedance to flow of polymer between the plate with the object of reducing bubble formation. Such a use, however, gives extremely high denier variations, which is the opposite of one of the objects of the present invention. The use of the channels in the arrangement proposed is the aforementioned patent, would, by reducing the polymer pressure, defeat its object, and hence could not be used in that context.

What we claim is:

1. In a process for the manufacture of filaments from a fibre-forming synthetic polymer by a process including the step of extruding the polymer through extrusion orifices contained in a spinneret plate, said process comprising: introducing molten polymer to at least one array of channels at one fixed point for each array; flowing the polymer in one direction only along the said channel; extruding the polymer through the orifices in the spinneret plate, said orifices being in communication with the said channels, to form filaments which are subsequently collected; and maintaining the impedance to flow of polymer through the channels in the array small compared with the impedance to flow through the extrusion orifices to provide controlled rates of volume flow of polymer through all extrusion orifices.

2. A process according to claim 1 wherein the impedance to flow of molten polymer through the extrusion orifices is substantially equal at each orifice and the rate of volume flow through all extrusion orifices is substantially equal.

3. A process according to claim 2 wherein the polymer is forced through a filter pack and collected from the bottom thereof and formed into a stream before being introduced into an array of channels.

4. A process according to claim 3 wherein polymer is collected into a single stream and forwarded to a point from which at least two arrays of channels radiate.

5. A process according to claim 4 wherein the polymer stream is divided into at least two smaller streams each of which streams is introduced into a separate array of channels.

6. A process according to claim 1 wherein the polymer is extruded through orifices of at least two different cross-sections.

7. Apparatus for melt spinning a fibre-forming polymer into filaments comprising a spinneret assembly containing a spinneret plate having a plurality of extrusion orifices formed therein, at least one array of substantially horizontal channels located above and in communication with the extrusion orifices, one of said orifices being in communication with the end of each channel, and means for introducing molten fibre-foaming polymer into each array of channels at a fixed point, all of said channels in each array being in communication at least indirectly with the point of introduction of the polymer to that array.

8. Apparatus according to claim 7 wherein each array of channels is formed in the upper surface of the spinneret plate and the extrusion orifices are located in the base of the channels.

9. Apparatus according to claim 7 wherein each array of channels is formed in the lower face of a plate positioned behind and in contact with the spinneret plate.

10. Apparatus according to claim 7 wherein each array of channels comprises a number of channels radiating outwardly from said fixed point.

11. Apparatus according to claim 7 wherein at least two arrays of channels communicate with said fixed point.

12. Apparatus according to claim 8 containing a filter-pack assembly located above the spinneret assembly wherein the means for introducing the molten polymer into an array of channels comprises a polymer collector plate positioned at the bottom of the filter pack assembly and containing an outlet orifice at said fixed point.

13. Apparatus according to claim 12 wherein the collector plate contains channels formed in the upper surface thereof communicating with an outlet orifice.

14. Apparatus according to claim 12 wherein each array of channels is formed in the lower face of said collector plate.

15. Apparatus according to claim 12 wherein the collector plate is integral with the filter pack assembly.

16. Apparatus according to claim 12 wherein the means for introducing the molten polymer into an array of channels includes a constriction placed at the entrance to each array.

17. Apparatus according to claim 16 wherein the constriction comprises an orifice plate positioned above and in contact with the spinneret plate, said orifice plate containing orifices positioned to communicate with the end of each array of channels located therebeneath, which arrays of channels are not in communication with each other.

18. Apparatus according to claim 17 wherein the orifices in the orifice plate communicate with the outlet orifice in said collector plate.

19. Apparatus according to claim 17 wherein each array of channels comprises a single channel communicating with at least one extrusion orifice.

20. Apparatus according to claim 12 wherein the extrusion orifices have at least two different cross-sections, the orifice in any one array of channels having the same cross-section.

21. In the process of manufacturing single-component filaments from a stream of fibre-forming synthetic polymer by passing the stream of polymer downwardly through a filter and subsequently extruding the polymer through orifices located below the filter to form filaments, the improvement which minimizes polymer stagnation prior to extrusion and which minimizes the effect of non-uniformities of packing and temperature in the filter, said improvement comprising: continuously colleting the stream of polymer from the filter and simultaneously conducting the collected polymer in a generally horizontal direction to a fixed point; providing a plurality of enclosed horizontal channels each of which is in direct communication with at least one extrusion orifice disposed at one end of the channel with its axis normal to the longitudinal axis of the channel; introducing polymer from said fixed point to each channel at a location remote from the orifice associated with that channel; and flowing the polymer in one direction only along each channel while maintaining the impedance to flow through said channel small compared with the impedance to flow through said orifices to provide controlled rates of volume flow of polymer through all orifices.

References Cited

UNITED STATES PATENTS

| 2,386,173 | 10/1945 | Kulp et al. |
| 2,910,725 | 11/1959 | Hildebrandt. |
| 2,971,219 | 2/1961 | Hill. |
| 3,249,669 | 5/1966 | Jamieson. |
| 3,303,530 | 2/1967 | Cobb. |
| 3,332,110 | 7/1967 | Strang. |
| 3,381,336 | 5/1968 | Well. |

FOREIGN PATENTS

| 3,926,142 | 11/1964 | Japan. |
| 6,412,114 | 4/1965 | Netherlands. |

JULIUS FROME, Primary Examiner

J. H. WOO, Assistant Examiner

U.S. Cl. X.R.

18—8